US010776581B2

(12) United States Patent
McCann et al.

(10) Patent No.: US 10,776,581 B2
(45) Date of Patent: *Sep. 15, 2020

(54) MULTITASK LEARNING AS QUESTION ANSWERING

(71) Applicant: salesforce.com, inc., San Francisco, CA (US)

(72) Inventors: Bryan McCann, Menlo Park, CA (US); Nitish Shirish Keskar, San Bruno, CA (US); Caiming Xiong, Mountain View, CA (US); Richard Socher, Menlo Park, CA (US)

(73) Assignee: salesforce.com, inc., San Francisco, CA (US)

( * ) Notice: Subject to any disclaimer, the term of this patent is extended or adjusted under 35 U.S.C. 154(b) by 208 days.

This patent is subject to a terminal disclaimer.

(21) Appl. No.: 15/974,118

(22) Filed: May 8, 2018

(65) Prior Publication Data
US 2019/0251168 A1 Aug. 15, 2019

Related U.S. Application Data

(60) Provisional application No. 62/628,850, filed on Feb. 9, 2018.

(51) Int. Cl.
*G06F 40/30* (2020.01)
*G06N 3/08* (2006.01)
(Continued)

(52) U.S. Cl.
CPC ............ *G06F 40/30* (2020.01); *G06F 16/243* (2019.01); *G06F 16/3329* (2019.01);
(Continued)

(58) Field of Classification Search
CPC ........ G06F 40/10; G06F 40/20; G06F 40/205; G06F 40/268; G06F 40/274;
(Continued)

(56) References Cited

U.S. PATENT DOCUMENTS 8,121,367 B2   2/2012   Socher et al.
8,355,550 B2   1/2013   Zhang et al.
(Continued)

OTHER PUBLICATIONS

International Search Report and Written Opinion from PCT/US2019/015901, pp. 1-18, dated May 8, 2019.
(Continued)

*Primary Examiner* — Eric Yen
(74) *Attorney, Agent, or Firm* — Haynes and Boone, LLP

(57) ABSTRACT

Approaches for multitask learning as question answering include an input layer for encoding a context and a question, a self-attention based transformer including an encoder and a decoder, a first bi-directional long-term short-term memory (biLSTM) for further encoding an output of the encoder, a long-term short-term memory (LSTM) for generating a context-adjusted hidden state from the output of the decoder and a hidden state, an attention network for generating first attention weights based on an output of the first biLSTM and an output of the LSTM, a vocabulary layer for generating a distribution over a vocabulary, a context layer for generating a distribution over the context, and a switch for generating a weighting between the distributions over the vocabulary and the context, generating a composite distribution based on the weighting, and selecting a word of an answer using the composite distribution.

20 Claims, 9 Drawing Sheets

(51) Int. Cl.
  *G06N 5/04* (2006.01)
  *G06N 3/04* (2006.01)
  *G06F 40/56* (2020.01)
  *G06F 16/242* (2019.01)
  *G06F 16/33* (2019.01)
  *G06F 16/332* (2019.01)
(52) U.S. Cl.
  CPC ...... *G06F 16/3334* (2019.01); *G06F 16/3344* (2019.01); *G06F 40/56* (2020.01); *G06N 3/0445* (2013.01); *G06N 3/0454* (2013.01); *G06N 3/08* (2013.01); *G06N 5/04* (2013.01)
(58) Field of Classification Search
  CPC ...... G06F 40/279; G06F 40/56; G06F 16/243; G06F 16/3329; G06F 16/3334; G06F 16/3344; G06N 3/02; G06N 3/04; G06N 3/0445; G06N 3/0454; G06N 3/08; G06N 5/04
  See application file for complete search history.

(56) References Cited

U.S. PATENT DOCUMENTS

| | | | |
|---|---|---|---|
| 10,282,663 B2 | 5/2019 | Socher et al. | |
| 10,346,721 B2 | 7/2019 | Albright et al. | |
| 10,474,709 B2 | 11/2019 | Paulus | |
| 10,565,318 B2 | 2/2020 | Bradbury | |
| 2004/0044791 A1* | 3/2004 | Pouzzner | G06F 16/9566 709/245 |
| 2013/0138384 A1 | 5/2013 | Kong et al. | |
| 2015/0161101 A1* | 6/2015 | Yao | G06F 40/30 704/9 |
| 2016/0307566 A1* | 10/2016 | Bellegarda | G06F 40/205 |
| 2016/0350653 A1* | 12/2016 | Socher | G06N 5/04 |
| 2017/0024645 A1 | 1/2017 | Socher et al. | |
| 2017/0032280 A1 | 2/2017 | Socher et al. | |
| 2017/0039174 A1* | 2/2017 | Strope | G06F 40/40 |
| 2017/0046616 A1 | 2/2017 | Socher et al. | |
| 2017/0076199 A1* | 3/2017 | Zhang | G06F 40/45 |
| 2017/0091168 A1* | 3/2017 | Bellegarda | G06N 3/0445 |
| 2017/0140240 A1 | 5/2017 | Socher et al. | |
| 2018/0082171 A1* | 3/2018 | Merity | G06N 3/084 |
| 2018/0096219 A1 | 4/2018 | Socher et al. | |
| 2018/0121787 A1 | 5/2018 | Hashimoto et al. | |
| 2018/0121788 A1 | 5/2018 | Hashimoto et al. | |
| 2018/0121799 A1 | 5/2018 | Hashimoto et al. | |
| 2018/0124331 A1* | 5/2018 | Min | G06K 9/00758 |
| 2018/0129931 A1 | 5/2018 | Bradbury et al. | |
| 2018/0129937 A1 | 5/2018 | Bradbury et al. | |
| 2018/0129938 A1 | 5/2018 | Xiong et al. | |
| 2018/0143966 A1 | 5/2018 | Lu et al. | |
| 2018/0144208 A1 | 5/2018 | Lu et al. | |
| 2018/0144248 A1 | 5/2018 | Lu et al. | |
| 2018/0150444 A1* | 5/2018 | Kasina | G06N 3/0454 |
| 2018/0157638 A1* | 6/2018 | Li | G10L 15/22 |
| 2018/0268287 A1 | 9/2018 | Johansen et al. | |
| 2018/0268298 A1 | 9/2018 | Johansen et al. | |
| 2018/0329883 A1* | 11/2018 | Leidner | G06F 40/117 |
| 2018/0336198 A1 | 11/2018 | Zhong et al. | |
| 2018/0336453 A1 | 11/2018 | Merity et al. | |
| 2018/0349359 A1 | 12/2018 | McCann et al. | |
| 2018/0373682 A1 | 12/2018 | McCann et al. | |
| 2018/0373987 A1 | 12/2018 | Zhang et al. | |
| 2019/0122103 A1* | 4/2019 | Gao | G06N 3/08 |
| 2019/0130206 A1 | 5/2019 | Trott et al. | |
| 2019/0130218 A1 | 5/2019 | Albright et al. | |
| 2019/0130248 A1 | 5/2019 | Zhong et al. | |
| 2019/0130249 A1 | 5/2019 | Bradbury et al. | |
| 2019/0130273 A1 | 5/2019 | Keskar et al. | |
| 2019/0130312 A1 | 5/2019 | Xiong et al. | |
| 2019/0130896 A1 | 5/2019 | Zhou et al. | |
| 2019/0130897 A1 | 5/2019 | Zhou et al. | |
| 2019/0149834 A1 | 5/2019 | Zhou et al. | |
| 2019/0163336 A1* | 5/2019 | Yu | G06K 9/00718 |
| 2019/0188568 A1 | 6/2019 | Keskar et al. | |
| 2019/0213482 A1 | 7/2019 | Socher et al. | |
| 2019/0251168 A1 | 8/2019 | McCann et al. | |
| 2019/0251431 A1 | 8/2019 | Keskar et al. | |
| 2019/0311210 A1* | 10/2019 | Chatterjee | G06F 16/58 |
| 2020/0034435 A1* | 1/2020 | Norouzi | G06F 40/58 |

OTHER PUBLICATIONS

Jan Niehues et al., "Exploiting Linguistic Resources for Neural Machine Translation Using Multi-task Learning", arxiv.org, Cornell University Library, 201 Olin Library Cornell University Ithaca, NY 14853, Aug. 3, 2017, XP080951202, arXiv:1708.00993v1, pp. 1-10.
International Search Report and Written Opinion from PCT/US2019/015909, pp. 1-19, dated May 15, 2019.
Ahmed et al., "Weighted Transformer Network for Machine Translation," arxiv.org, Cornell University Library, 201 Olin Library Cornell University Ithaca, NY 14853, Nov. 6, 2017, XP080834864, arXiv:1711.02132v1, (pp. 1-10).
McCann et al., "The Natural Language Decathlon: Multitask Learning as Question Answering", arxiv.org, Cornell University Library, 201 Olin Library Cornell University Ithaca, NY 14853, Jun. 20, 2018, XP080893587, arXiv:1806.08730v1, pp. 1-23.
Merity et al., "Pointer Sentinel Mixture Models," Sep. 26, 2016 (Sep. 26, 2016), XP055450460, arXiv:1609.07843v1, pp. 1-13.
Xiong et al., "DCN+: Mixed Objective and Deep Residual Coattention for Question Answering", Nov. 10, 2017, XP055541783, arXiv:1711.00106v2, pp. 1-10.
Zhao et al., "Generative Encoder-Decoder Models for Task-Oriented Spoken Dialog Systems with Chatting Capability," Jun. 26, 2017, XP080772645, arXiv:1706.08476v1, pp. 1-10.
Alonso et al., "When is Multitask Learning Effective? Semantic Sequence Prediction Under Varying Data Conditions," European Chapter of the Association for Computational Linguistics Valencia, (Apr. 3-7, 2017) pp. 1-11 arXiv:1612.02251v2.
Bahdanau et al., "Neural Machine Translation by Jointly Learning to Align and Translate," Published as a conference paper at International Conference on Learning Representations (ICLR) 2015 (May 19, 2016) pp. 1.15 arXiv:1409.0473v7.
Ben-David et al., "Exploiting Task Relatedness for Multiple Task Learning," Springer, Berlin, Heidelberg in: Schölkopf B., Warmuth M.K. (eds) Learning Theory and Kernel Machines. Lecture Notes in Computer Science, vol. 2777, (2003) pp. 567-580, pp. 1-8 https://pdfs.semanticscholar.org/b61d/cc853d9b15ec3dc99e2a537621804a0d97d4.pdf.
Bingel et al., "Identifying Beneficial Task Relations for Multi-task Learning in Deep Neural Networks," European Chapter of the Association for Computational Linguistics Valencia, (Apr. 3-7, 2017) pp. 1-6 arXiv:1702.08303v1.
Cettolo et al., "The IWSLT 2015 Evaluation Campaign," International Workshop on Spoken Language Translation (Dec. 3, 2015) pp. 1-13 workshop2015.iwslt.org/downloads/IWSLT_Overview15.pdf.
Collobert et al., "A Unified Architecture for Natural Language Processing: Deep Neural Networks with Multitask Learning," Appearing in Proceedings of the 25th International Conference on Machine Learning, Helsinki, Finland (2008) pp. 1-8 https://ronan.collobert.com/pub/matos/2008_nlp_icml.pdf.
French, Robert M., "Catastrophic Interference in Connectionist Networks," Trends in Cognitive Sciences, vol. 3, No. 4 1999 Elsevier Science (Apr. 1999) pp. 1-8 https://www.researchgate.net/profile/Robert_French/publication/228051810_Catastrophic_Forgetting_in_Connectionist_Networks/links/5a25c2f10t7e9671dd09cf84/Catastrophic-Forgetting-in-Connectionist-Networks.pdf.
Graves et al., "Framewise Phoneme Classification with Bidirectional LSTM and Other Neural Network Architectures,"s vol. 18, (2005)—Elsevier pp. 602-610, pp. 1-9 www.elsevier.com/locate/neunet.
Hashimoto et al., "A Joint Many-Task Model—Growing a Neural Network for Multiple NPL Tasks" 2017 Conference on Empirical

(56) References Cited

OTHER PUBLICATIONS

Methods in Natural Language Processing (EMNLP 2017), (Jul. 24, 2017) pp. 1-15 arXiv:1611.01587v5.
Johnson et al., "Google's Multilingual Neural Machine Translation System: Enabling Zero-Shot Translation," (Nov. 14, 2016) pp. 1-17 arXiv:1611.04558v2.
Kingma et al., "ADAM: A Method for Stochastic Optimization," Published as a conference paper at International Conference on Learning Representations (ICLR) (Jan. 30, 2017) pp. 1-15 arXiv:1412.6980.
Kirkpatrick et al., "Overcoming Catastrophic Forgetting in Neural Networks," Proceedings of the National Academy of Sciences of the United States of America, vol. 114, No. 13, (Mar. 28, 2017) pp. 3521-3526, pp. 1-6 www.pnas.org/cgi/doi/10.1073/pnas.1611835114.
Kumar et al. "Ask Me Anything: Dynamic Memory Networks for Natural Language Processing," Proceedings of the 33rd International Conference on Machine Learning (PMLR) vol. 48 (Mar. 5, 2016) pp. 1378-1387, pp. 1-10 arXiv:1506.07285v5.
Lee et al., "Overcoming Catastrophic Forgetting by Incremental Moment Matching," Advances in Neural Information Processing Systems, 31st Conference on Neural Information Processing Systems (NIPS 2017), Long Beach, CA, USA, (Mar. 24, 2017) pp. 4655-4665, pp. 1-16 arXiv:1703.08475v3.
Mallya et al., "PackNet: Adding Multiple Tasks to a Single Network by Iterative Pruning" (Nov. 15, 2017) pp. 1-9 arXiv:1711.05769.
Mallya et al., "Piggyback: Adapting a Single Network to Multiple Tasks by Learning to Mask Weights" (Mar. 16, 2018) pp. 1-16 arXiv:1801.06519v2.
McCann et al., "Learned in Translation: Contextualized Word Vectors," in Advances in Neural Information Processing Systems (NIPS) (Aug. 1, 2017) pp. 6297-6307, pp. 1-11 arXiv:1708.00107.
Natural Language Computing Group, Microsoft Research Asia, "R-NET: Machine Reading Comprehension with Self-matching Networks," (May 8, 2017) pp. 1-11 https://www.microsoft.com/en-us/research/wp-content/uploads/2017/05/r-net.pdf.
Papineni et al., "BLEU: a Method for Automatic Evaluation of Machine Translation," Proceedings of the 40th Annual Meeting of the Association for Computational Linguistics (ACL), Philadelphia, (Jul. 2002) pp. 311-318, pp. 1-8 https://www.aclweb.org/anthology/P02-1040.pdf.
Pennington et al., "GloVe: Global Vectors for Word Representation," Proceedings of the 2014 Conference on Empirical Methods in Natural Language Processing (EMNLP). Doha, Qatar (Oct. 25-29, 2014) pp. 1-12.
Radford et al., "Learning to Generate Reviews and Discovering Sentiment" (Apr. 6, 2017) pp. 1-9 arXiv:1704.01444.
Rajpurkar et al., "SQuAD: 100,000+ Questions for Machine Comprehension of Text," Proceedings of the 2016 Conference on Empirical Methods in Natural Language Processing. Austin, Texas (Nov. 1-5, 2016) pp. 1-10.
Rebuffi et al., "iCaRL: Incremental Classifier and Representation Learning," Accepted paper at Computer Vision and Pattern Recognition (CVPR) (Apr. 14, 2017) pp. 1-15 arXiv:1611.07725v2.
Robins, Anthony, "Catastrophic Forgetting, Rehearsal, and Pseudorehearsal," Connection Science: Journal of Neural Computing, Artificial Intelligence and Cognitive Research, vol. 7, No. 2, Taylor, Francis Online, (Jan. 1998) pp. 123-146, pp. 1-33 https://www.tandfonline.com/doi/abs/10.1080/09540099550039318.
Rosenfeld et al., "Incremental Learning Through Deep Adaptation" (May 11, 2017) pp. 1-13 arXiv:1705.04228.
Ruder, Sebastian, "An Overview of Multi-Task Learning in Deep Neural Networks" (Jun. 15, 2017) pp. 1-14 arXiv:1706.05098v1.
Schaul et al., "Prioritized Experience Replay," Published as a conference paper at (ICLR) International Conference on Learning Representations 2016 (Feb. 25, 2016) pp. 1-15 arXiv:1511.05952.
See et al., "Get to the Point: Summarization with Pointer-Generator Networks," Proceedings of the 55th Annual Meeting of the Association for Computational Linguistics (vol. 1: Long Papers) (Apr. 14, 2017) pp. 1-20 http://aclweb.org/anthology/P17-1099.
Socher et al., "Recursive Deep Models for Semantic Compositionality Over a Sentiment Treebank," Proceedings of the 2013 Conference on Empirical Methods in Natural Language Processing, Seattle, Washington, USA, Association for Computational Linguistics (Oct. 18-21, 2013) pp. 1631-1642, pp. 1-12 http://www.aclweb.org/anthology/D13-1170.
Sutskever et al., "Sequence to Sequence Learning with Neural Networks," Advances in Neural Information Processing Systems, (Dec. 14, 2014) pp. 3104-3112 pp. 1-9 arXiv:1409.3215.
Vaswani et al., "Attention Is All You Need," 31st Conference on Neural Information Processing Systems (NIPS 2017), Long Beach, CA, USA. (Jun. 12, 2017) pp. 1-15 arXiv:1706.03762.
Vinyals et al., "Pointer Networks," Advances in Neural Information Processing Systems (Jan. 2, 2017) pp. 1-9 https://arxiv.org/abs/1506.03134v2.
Wang et al., "Machine Comprehension Using Match-LSTM and Answer Pointer" International Conference on Learning Representations, Toulon, France. Research Collection School of Information Systems. (Apr. 24-26, 2017) pp. 1-16.
Xiong et al., "Dynamic Memory Networks for Visual and Textual Question Answering," Proceedings of the 33rd International Conference on Machine Learning, New York, NY, USA. JMLR: W&CP vol. 48. (Mar. 4, 2016) pp. 1-10 arXiv:1603.01417v1.

* cited by examiner

Task Type: Sentiment Analysis (e.g., Classification)
Context: This one is definitely one to skip, even for horror movie fanatics.
Question: Is this sentence positive or negative?
Answer: Negative

Task Type: Language Translation
Context: Reality and history have endowed that title with grandeur.
Question: What is the translation from English to French?
Answer: La ralit et l'histoire ont dot ce titre d'une grandeur.

Task Type: Question Answering
Context: With Rivera having been a linebacker with the Chicago Bears in Super Bowl XX, and Kubiak replacing Elway at the end of the Broncos' defeats in Super Bowls XXI and XXIV, this will be the first Super Bowl in which both head coaches played in the game themselves.
Question: Who was the Panthers head coach for the 2015 season?
Answer: Rivera

FIG. 1

| Task | Single | Joint | Hybrid |
|---|---|---|---|
| En-De Translation | 20.41 | 7.31 | 14.18 |
| En-Fr Translation | 32.23 | 10.89 | 22.82 |
| Question Answering | 67.02 | 26.31 | 60.03 |
| Sentiment Classification | 85.55 | 78.56 | 79.36 |
FIG. 8
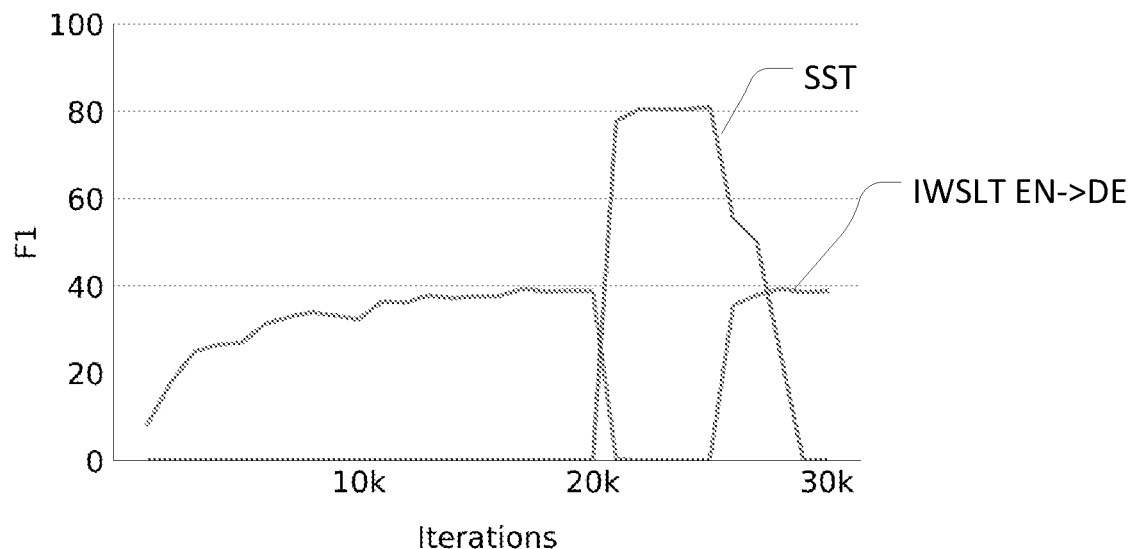
FIG. 10A
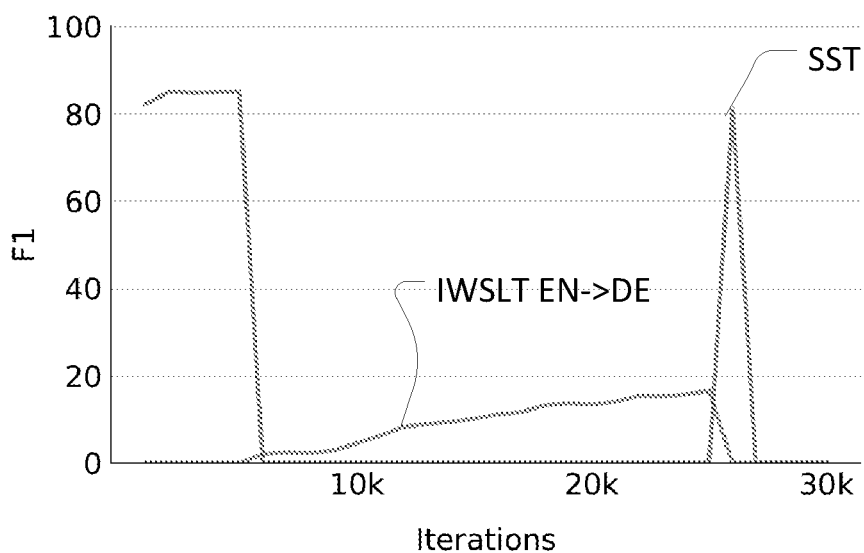
FIG. 10B

MULTITASK LEARNING AS QUESTION ANSWERING

RELATED APPLICATIONS

This application claims the benefit of U.S. Provisional Patent Application No. 62/628,850 filed Feb. 9, 2018 and entitled "Multitask Learning as Question Answering", which is incorporated by reference in its entirety.

This application is related to contemporaneously filed U.S. patent application Ser. No. 15/974,075 filed May 7, 2018 entitled "Multitask Learning as Question Answering", which is incorporated by reference in its entirety.

TECHNICAL FIELD

The present disclosure relates generally to natural language processing and more specifically to answering natural language questions about a natural language context.

BACKGROUND

Natural language processing and the ability of a system to answer natural language questions about the content of a natural language sample is a benchmark to test for context-specific reasoning about information provided in natural language form. This can be a complex task because there are many different types of natural language questions that can be asked and whose answering may require different types of reasoning and/or different types of analysis.

Accordingly, it would be advantageous to have unified systems and methods for simultaneously being able to answer different kinds of natural language questions.

BRIEF DESCRIPTION OF THE DRAWINGS

FIG. 1 is a simplified diagram of natural language processing tasks according to some embodiments.

FIGS. 8 and 9A-9C are simplified diagrams of training performance according to some embodiments.

FIGS. 10A and 10B are simplified diagrams of training performance based on training order according to some embodiments.

In the figures, elements having the same designations have the same or similar functions.

DETAILED DESCRIPTION

Context specific reasoning, including context specific reasoning regarding the content of natural language information, is an important problem in machine intelligence and learning applications. Context specific reasoning may provide valuable information for use in the interpretation of natural language text and can include different tasks, such as answering questions about the content of natural language text, language translation, semantic context analysis, and/or the like. However, each of these different types of natural language processing tasks often involve different types of analysis and/or different types of expected responses.

Multitask learning in natural language processing has made progress when the task types are similar. However, when tackling different types of tasks, such as language translation, question answering and classification, parameter sharing is often limited to word vectors or subsets of parameters. The final architectures are typically highly optimized and engineered for each task type, limiting their ability to generalize across task types.

However, many of these task types can be handled by the same architecture and model when framed as a single type of task. For example, it is possible to treat many, if not all, natural language processing tasks as question answering tasks. For example, the task types of classification, language translation, and question answering may all be framed as question answering tasks. Examples of each of these three task types in question answering form are shown in FIG. 1.

Figure 2:
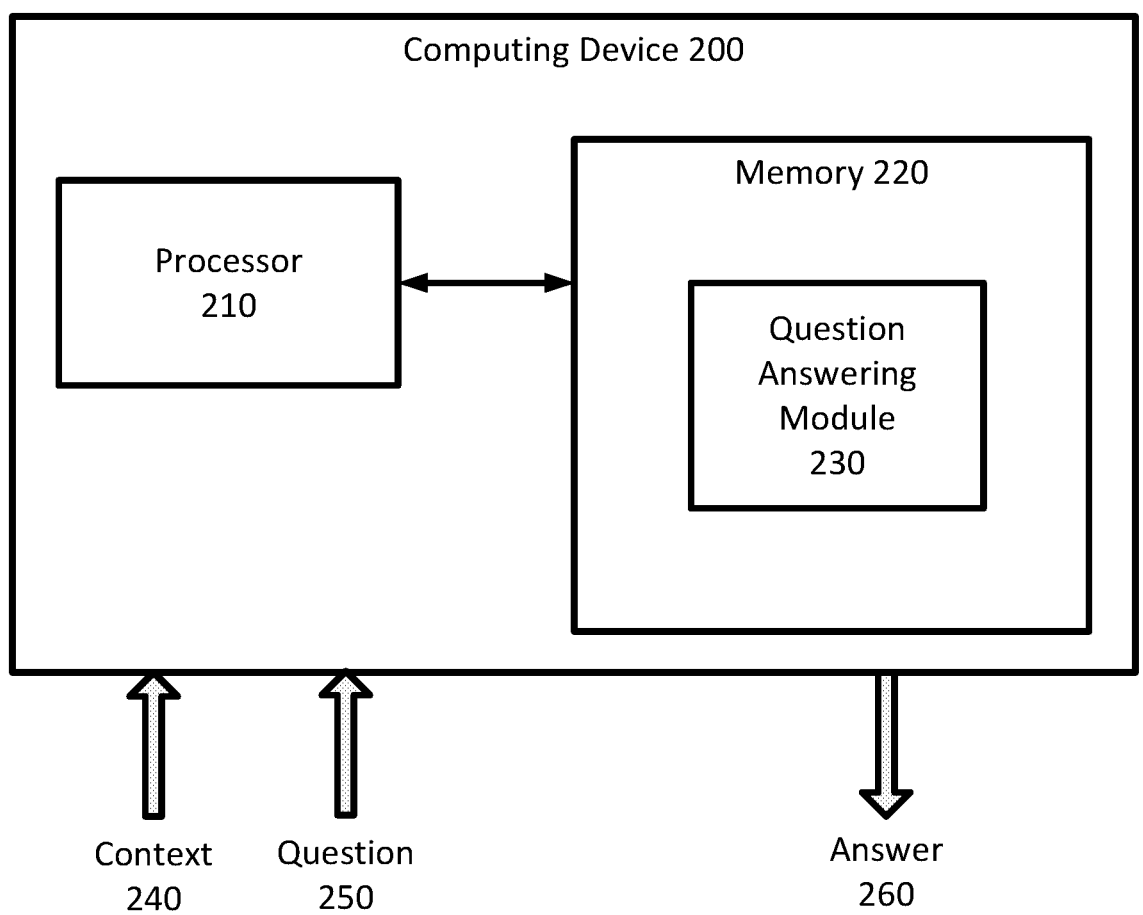
FIG. 2 is a simplified diagram of a computing device according to some embodiments.

FIG. 2 is a simplified diagram of a computing device 200 according to some embodiments. As shown in FIG. 2, computing device 200 includes a processor 210 coupled to memory 220. Operation of computing device 200 is controlled by processor 210. And although computing device 200 is shown with only one processor 210, it is understood that processor 210 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 200. Computing device 200 may be implemented as a stand-alone subsystem, as a board added to a computing device, and/or as a virtual machine.

Memory 220 may be used to store software executed by computing device 200 and/or one or more data structures used during operation of computing device 200. Memory 220 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 210 and/or memory 220 may be arranged in any suitable physical arrangement. In some embodiments, processor 210 and/or memory 220 may be implemented on a same board, in a same package (e.g., system-in-package), on a same chip (e.g., system-on-chip), and/or the like. In some embodiments, processor 210 and/or memory 220 may include distributed, virtualized, and/or containerized computing resources. Consistent with such embodiments, processor 210 and/or memory 220 may be located in one or more data centers and/or cloud computing facilities.

As shown, memory 220 includes a question answering module 230 that may be used to implement and/or emulate the question answering systems and models described further herein and/or to implement any of the methods described further herein. In some examples, question answering module 230 may be used to answer natural language questions about natural language contexts. In some examples, question answering module 230 may also handle the iterative training and/or evaluation of a question answering system or model used to answer natural language questions about natural language contexts. In some examples, memory 220 may include non-transitory, tangible, machine readable media that includes executable code that when run by one or more processors (e.g., processor 210) may cause the one or more processors to perform the counting methods described in further detail herein. In some examples, question answering module 230 may be implemented using hardware, software, and/or a combination of hardware and software. As shown, computing device 200 receives a natural language context 240 and a natural language question 250 about natural language context 240, which are provided to question answering module 230, question answering module 230 then generates a natural language answer 260 to natural language question 250 based on the content of natural language context 240.

Figure 3:
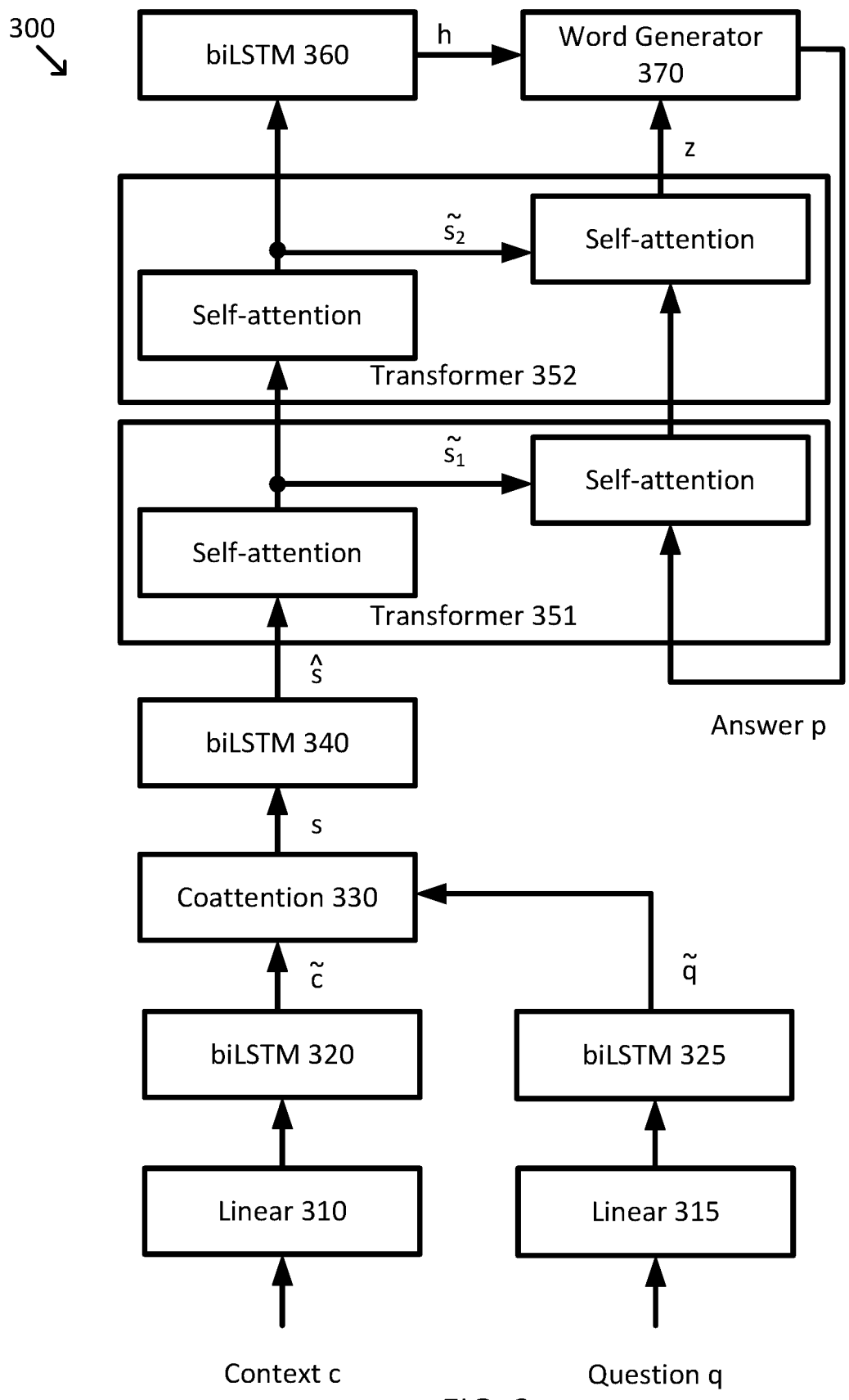
FIG. 3 is a simplified diagram of a system for multitask question answering according to some embodiments.

FIG. 3 is a simplified diagram of a system 300 for multitask question answering according to some embodiments. System 300 receives a natural language context c and a natural language question q. Each of context c and question q are encoded into vectors for processing by system 300. In some examples, each of the words in context c and question q are encoded using a word encoding. In some examples, the encoding of each word is based on the GloVe encodings where each word is encoded as an element of $\mathbb{R}^{300}$. In some examples, the encoding of each word is based on the character n-gram encodings where each word is encoded as an element of $\mathbb{R}^{300}$. In some example, the encoding of each word is based on a concatenation of GloVe and character engram encodings. In some examples, when there is no GloVe and/or character n-gram encoding for a word (e.g., the word is not in English), a random encoding is selected from a Normal distribution having a mean and standard deviation that is the same as the GloVe encodings (e.g., mean of zero and standard deviation of 0.4), with the same random encoding used consistently for each occurrence of the respective word.

The encodings for context c are then passed to a linear layer 310 and the encodings for question q are passed to a linear layer 315. Each of linear layer 310 and 315 implement a respective transfer function consistent with Equation 1, where W and b are the weights and bias of the respective linear layer 310 or 315, a is the output of the respective linear layer 310 or 315, x is the input to the respective linear layer 310 or 315, and f is a linear transfer function of the respective linear layer 310 or 315, such as a pure linear function, a saturating linear function, and/or the like. In some examples, linear layers 310 and 315 reduce the dimensionality of the encodings for context c and question q. In some examples, the dimensionality of the encodings is reduced to that each encoding is an element of $\mathbb{R}^{300}$.

$$a = f(Wx + b) \quad \text{Equation 1}$$

The encodings output by linear layers 310 and 315 are, respectively, further encoded by a one-layer bidirectional long short-term memory network (biLSTM) 320 to form $\tilde{c}$ and by a biLSTM 325 to form $\tilde{q}$. In some examples, biLSTM 320 and/or 325 may further reduce the dimensionality of the encodings for context c and question q. Each of biLSTMs 320 and 325 generates an output at each time step i as $h_i$ as the concatenation of $\overrightarrow{h_i}$ and $\overleftarrow{h_i}$ according to Equation 2, where x is the input to the respective biLSTM and LSTM corresponds to a long-term short-term memory network. In some examples, biLSTMs 320 and/or 325 have a hidden size of 200 and further reduce the dimensionality of the encodings of $\tilde{c}$ and $\tilde{q}$ to elements $\mathbb{R}^{200}$.

$$\overrightarrow{h_i} = \text{LSTM}(x_i, \overrightarrow{h_{i-1}})$$

$$\overleftarrow{h_i} = \text{LSTM}(x_i, \overleftarrow{h_{i+1}}) \quad \text{Equation 2}$$

The outputs $\tilde{c}$ and $\tilde{q}$ are then passed to a coattention layer 330. Coattention layer 330 first prepends $\tilde{c}$ with a context sentinel vector and prepends $\tilde{q}$ with a question sentinel vector. The sentinel vectors allow the coattention mechanism of coattention layer 330 to refrain from aligning all of the tokens between the two sequences. Coattention layer 330 then stacks the vectors $\tilde{c}$ and $\tilde{q}$ along the time dimension to get $\hat{C}$ and $\hat{Q}$, respectively. Coattention layer 330 then generates an affinity matrix A according to Equation 3.

$$A = \hat{C}^T \hat{Q} \quad \text{Equation 3}$$

Coattention layer 330 then generates attention weights $A_c$ and $A_q$ over each sequence using Equation 4, where softmax (X) normalizes over the columns of X.

$$A_c = \text{softmax}(A)$$

$$A_q = \text{softmax}(A^T) \quad \text{Equation 4}$$

Coattention layer 330 then uses the attention weight $A_c$ and $A_q$ to generate weighted summations of the context and question as $\tilde{C}$ and $\tilde{Q}$, respectively, using Equation 5.

$$\tilde{C} = \hat{C} A_c$$

$$\tilde{Q} = \hat{Q} A_q \quad \text{Equation 5}$$

Coattention layer 330 then generates a coattention summary S as the concatenation of $\tilde{C} A_q$ and $\tilde{Q}$. The coattention summary S includes a sequence of vectors s and the first vector from s, which corresponds to the sentinel position, may be dropped. S is then passed to a biLSTM 340. biLSTM 340 generates an output $\hat{s}$ to which positional encodings are added.

Output $\hat{s}$ is then passed to a multi-layer self-attention-based transformer that generates encodings $\hat{s}_i$ for each of the layers i of the multi-layer self-attention-based transformer. As shown in FIG. 3, the multi-layer self-attention-based transformer includes transformer layers 351 and 352. And although the multi-layer self-attention-based transformer is shown with two layers, in some embodiments the multi-layer self-attention-based transformer may include only a single layer or three or more layers. Each transformer layer 351 and 352 includes multi-head self-attention mechanisms that are followed by a position-wise fully connected feed-forward network along with a residual connection and layer normalization as is described in further detail below with respect to FIGS. 4 and 5.

Figure 4:
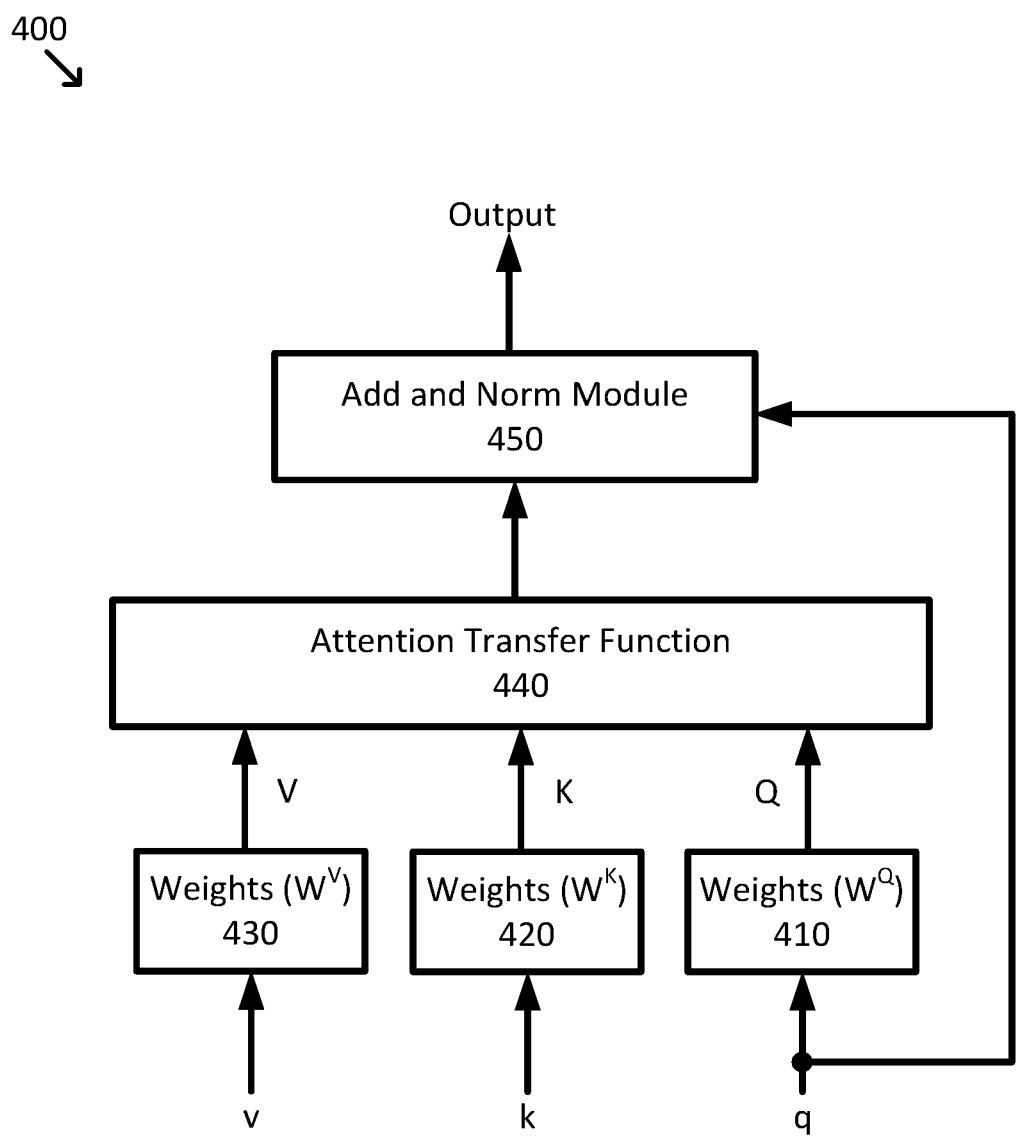
FIG. 4 is a simplified diagram of an attention network according to some embodiments.

FIG. 4 is a simplified diagram of an attention network 400 according to some embodiments. As shown in FIG. 4, attention network 400 receives a query $q \in \mathbb{R}^{d_q}$, a key $k \in \mathbb{R}^{d_k}$, and a value $v \in \mathbb{R}^{d_v}$. Each of the q, k, and v are subject to respective weights $W^Q$ 410, $W^K$ 420, and $W^V$ 430 according to Equations 6-8. The weights $W^Q$ 410, $W^K$ 420, and $W^V$ 430 are altered during training using back propagation.

$$Q = qW^Q \in \mathbb{R}^{d_q} \quad \text{Equation 6}$$

$$K = kW^K \in \mathbb{R}^{d_k} \quad \text{Equation 7}$$

$$V = vW^V \in \mathbb{R}^{d_v} \quad \text{Equation 8}$$

The resulting Q, K, and V vectors are passed through an attention transfer function 440, which generates a dot product of Q and K, which is then applied to V according to Equation 9.

$$\text{Attention}(Q, K, V) = \text{softmax}\left(\frac{QK^T}{\sqrt{d_k}}\right)V \in \mathbb{R}^{d_v} \quad \text{Equation 9}$$

An addition and normalization module 450 is then used to combine the query q with the output from attention transfer function to provide a residual connection that improves the rate of learning by attention network 400. Addition and normalization module 450 implements Equation 10 where $\mu$ and $\sigma$ are the mean and standard deviation, respectively, of the input vector and $g_i$ is gain parameter for scaling the layer normalization. The output from addition and normalization module 450 is the output of attention network 400.

$$\text{LayerNorm}(\text{Attention}(Q, K, V) + q) \quad \text{Equation 10}$$
$$\text{LayerNorm}(a_i) = g_i \frac{a_i - \mu}{\sigma}$$

Attention network 400 is often used in two variant forms. The first variant form is a multi-head attention layer where multiple attention networks consistent with attention network 400 are implemented in parallel, which each of the "heads" in the multi-head attention network having its own weights $W^Q$ 410, $W^K$ 420, and $W^V$ 430, which are initialized to different values and thus trained to learn different encodings. The outputs from each of the heads are then concatenated together to form the output of the multi-head attention layer. The second variant form is a self-attention layer that is a multi-head attention layer where the q, k, and v inputs are the same for each head of the attention network.

Self-attention based layers are further described in Vaswani, et al., "Attention is All You Need," arXiv preprint arXiv:1706.03762, submitted Jun. 12, 2017, which is hereby incorporated by reference in its entirety.

Figure 5:
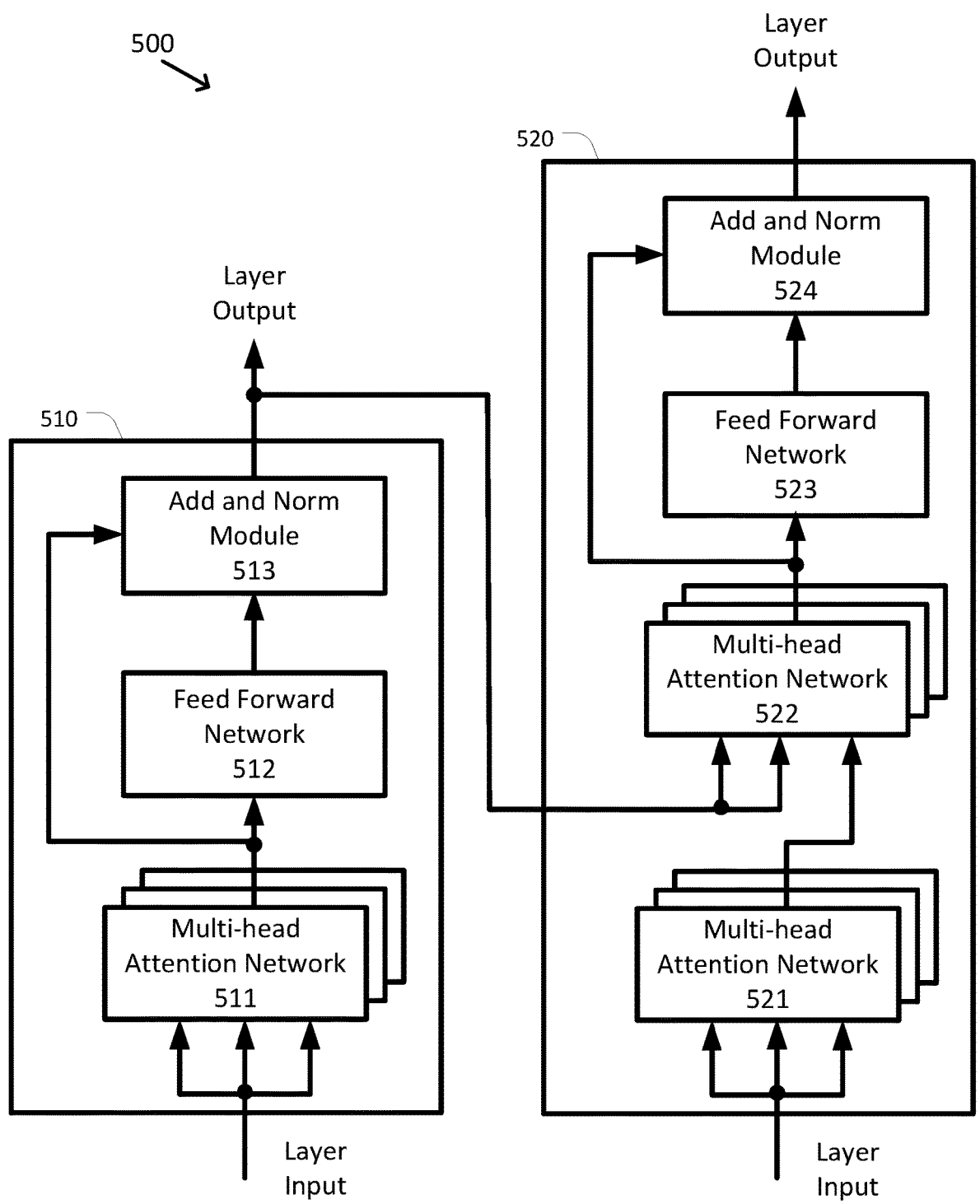
FIG. 5 is a simplified diagram of a layer for an attention-based transformer network according to some embodiments.

FIG. 5 is a simplified diagram of a layer 500 for an attention-based transformer network according to some embodiments. According to some embodiments, each transformer layer 351 and/or 352 of system 300 is consistent with layer 500. As shown in FIG. 5, layer 500 includes an encoding layer 510 and a decoding layer 520.

Encoding layer 510 receives layer input (e.g., from an input network for a first layer in an encoding stack or from layer output of a next lowest layer for all other layers of the encoding stack) and provides it to all three (q, k, and v) inputs of a multi-head attention layer 511, thus multi-head attention layer 511 is configured as a self-attention network. Each head of multi-head attention layer 511 is consistent with attention network 400. In some examples, multi-head attention layer 511 includes three heads, however, other numbers of heads such as two or more than three are possible. In some examples, each attention layer has a dimension of 200 and a hidden size of 128. The output of multi-head attention layer 511 is provided to a feed forward network 512 with both the input and output of feed forward network 512 being provided to an addition and normalization module 513, which generates the layer output for encoding layer 510. In some examples, feed forward network 512 is a two-layer perceptron network, which implements Equation 11 where $\gamma$ is the input to feed forward network 512 and $M_i$ and $b_i$ are the weights and biases respectively of each of the layers in the perceptron network. In some examples, addition and normalization module 513 is substantially similar to addition and normalization module 450.

$$FF(\gamma) = \max(0, \gamma M_1 + b_1)M_2 + b_2 \quad \text{Equation 11}$$

Decoding layer 530 receives layer input (e.g., from an input network for a first layer in a decoding stack or from layer output of a next lowest layer for all other layers of the decoding stack) and provides it to all three (q, k, and v) inputs of a multi-head attention layer 521, thus multi-head attention layer 521 is configured as a self-attention network. Each head of multi-head attention layer 521 is consistent with attention network 400. In some examples, multi-head attention layer 521 includes three heads, however, other numbers of heads such as two or more than three are possible. The output of multi-head attention layer 511 is provided as the q input to another multi-head attention layer 522 and the k and v inputs of multi-head attention layer 522 are provided with the encoding s output from the corresponding encoding layer. Each head of multi-head attention layer 521 is consistent with attention network 400. In some examples, multi-head attention layer 522 includes three heads, however, other numbers of heads such as two or more than three are possible. In some examples, each attention layer has a dimension of 200 and a hidden size of 128. The output of multi-head attention layer 522 is provided to a feed forward network 523 with both the input and output of feed forward network 523 being provided to an addition and normalization module 524, which generates the layer output for encoding layer 510. In some examples, feed forward network 523 and addition and normalization module 524 are substantially similar to feed forward network 512 and addition and normalization module 513, respectively.

Referring back to FIG. 3, the output of the encoding side of the multi-layer self-attention-based transformer (e.g., $\tilde{s}_2$ in the examples of FIG. 3) is passed to a biLSTM 360, which generates the final encoded sequence h. The final encoded sequence h is then passed to a word generator 370 as is described in further detail below with respect to FIG. 6. In some examples, biLSTM 360 has a hidden size of 200.

Figure 6:
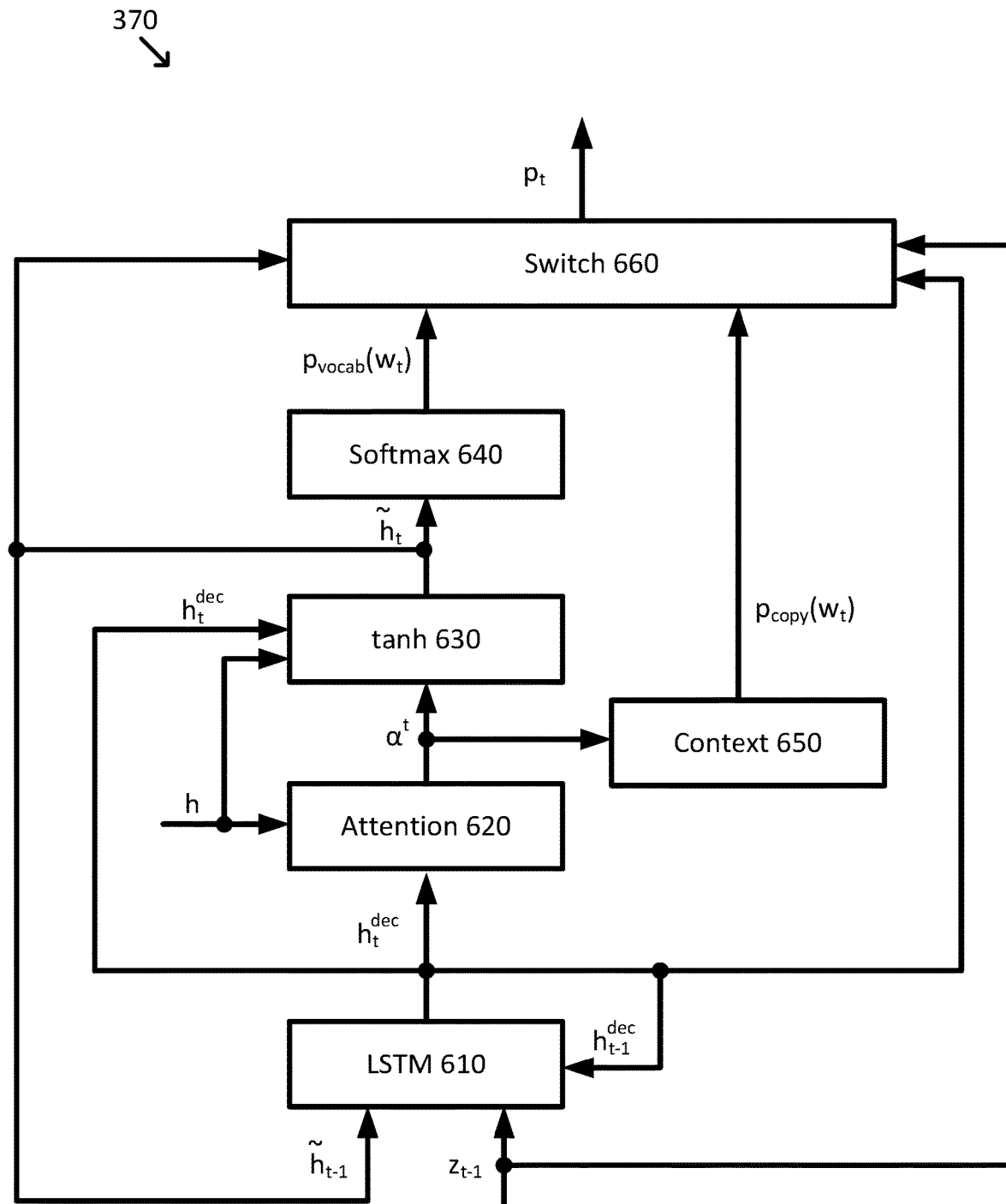
FIG. 6 is a simplified diagram of a word generator according to some embodiments.

The output of the decoding side of the multi-layer self-attention-based transformer is a sequence of vectors z. The sequence of vectors z is also passed to word generator 370 and as each of the words in the answer p are generated, they are passed back to the first layer of the decoding side of the multi-layer self-attention-based transformer FIG. 6 is a simplified diagram of word generator 370 according to some embodiments. Word generator 370 treats z as a sequence of input vectors and h as its context for attention. Word generator operates iteratively to generate the answer p for system 300. Answer p is first initialized using a sentinel entry, which is removed after the complete answer p is generated. At each iteration t (as denoted by the subscripts in FIG. 6), a next word in answer p is generated as $p_t$ as further described below.

At time-step t, a one-layer, unidirectional LSTM 610 produces a context-adjusted hidden state $h_t^{dec}$ based on a concatenation of the previous input $z_{t-1}$ from the decoder side of the multi-layer self-attention-based transformer and a previous hidden-state $\tilde{h}_{t-1}$ from the previous time step t as well as the previous context-adjusted hidden state $h_{t-1}^{dec}$ using Equation 12.

$$h_t^{dec} = \text{LSTM}([z_{t-1}; \tilde{h}_{t-1}], h_{t-1}^{dec}) \quad \text{Equation 12}$$

An attention layer 620 then generates a vector of attention weights $\alpha^t$ representing the relevance of each encoding time-step to the current decoder state based on the final encoded sequence h and the context-adjusted hidden state $h_t^{dec}$ using Equation 13, where H is the elements of h stacked over the time dimension and $W_1$ and $b_1$ are trainable weights and a bias for attention layer 620.

$$\alpha^t = \text{softmax}(H(W_1 h_t^{dec} + b_1)) \qquad \text{Equation 13}$$

A vocabulary layer including a tanh layer 630 and a softmax layer 640 then generates a distribution over each of the words in a vocabulary $p_{vocab}(w_t)$ that are candidates as the next word $p_t$ of the answer p. Tanh layer 630 generates the hidden state $\tilde{h}_t$ for the current time step based on the attention weights $\alpha^t$, the final encoded sequence h, and the context-adjusted hidden state $h_t^{dec}$ using Equation 14, where H is the elements of h stacked over the time dimension and $W_2$ and $b_2$ are trainable weights and a bias for tanh layer 630.

$$\tilde{h}_t = [\tanh(W_2 H^T \alpha^t + b_2; h_t^{dec})] \qquad \text{Equation 14}$$

Softmax layer 640 generates the distribution over each of the words in a vocabulary $p_{vocab}(w_t)$ that are candidates as the next word $p_t$ of the answer p based on the hidden state $\tilde{h}_t$ using Equation 15, where $W_{out}$ and $b_{out}$ are trainable weights and a bias for softmax layer 640.

$$p_{vocab}(w_t) = \text{softmax}(W_{out} \tilde{h}_t + b_{out}) \qquad \text{Equation 15}$$

A context layer 650 generates a distribution over each of the words in context c $p_{copy}(w_t)$ that are candidates as the next word $p_t$ of the answer p based on the attention weights $\alpha^t$ using Equation 16.

$$p_{copy}(w_t) = \sum_{i: c_i = w_t} \alpha_i^t \qquad \text{Equation 16}$$

A switch 660 decides how to weight the $p_{vocab}(w_t)$ and $p_{copy}(w_t)$ distributions relative to each other. Switch 660 first generates a weighting factor $\gamma$ based on a concatenation of the hidden state $\tilde{h}_t$, the context-adjusted hidden state $h_t^{dec}$, and the previous input $z_{t-1}$ from the decoder side of the multi-layer self-attention-based transformer using Equation 17, where $\sigma$ represents a sigmoid transfer function such as log-sigmoid, hyperbolic tangent sigmoid, and/or the like and $W_{switch}$ are trainable weights for the weighting factor layer. In some examples, the weighting factor $\gamma$ may further be determined using a trainable bias $b_{switch}$.

$$\gamma = \sigma(W_{switch}[\tilde{h}_t; h_t^{dec}; z_{t-1}]) \qquad \text{Equation 17}$$

Switch 660 then generates a final output distribution over the union of words in the vocabulary and words in the context using the weighting factor $\gamma$ using Equation 18. The next word $p_t$ in the answer p can then be determined based on the word in $p(w_t)$ with the largest weighting.

$$p(w_t) = \gamma p_{vocab}(w_t) + (1-\gamma) p_{copy} \qquad \text{Equation 18}$$

As discussed above and further emphasized here, FIG. 3 is merely an example which should not unduly limit the scope of the claims. One of ordinary skill in the art would recognize many variations, alternatives, and modifications. According to some embodiments, one or more of the layers in system 300 are optional and may be omitted. In some examples, linear layers 310 and/or 315 are optional and may be omitted with the encodings used for context c and question q being passed directly to biLSTM 320 and 325, respectively. In some examples, biLSTMs 320 and/or 325 are optional and may be omitted with the output of linear layers 310 and 315 being passed directly to coattention layer 330. In some examples, linear layers 310 and 315 and biLSTMs 320 and 325 are optional and may be omitted with the encodings used for context c and question q being passed directly to coattention layer 330.

Because system 300 is used for multiple tasks (e.g., classification (such as sentiment analysis), language translation, and question answering) and shares its parameters for the various layers across all the task types, it may be susceptible to catastrophic forgetting if it is not trained carefully. To address this, in some embodiments, system 300 may be trained according to a joint strategy where system 300 is trained using an ordering where training samples are presented so as to train system 300 against a balanced mix of each of the task types concurrently. That is, the order in which training samples are presented to system 300 selects consecutive training samples or consecutive small groups (e.g., 2-10 or so) training samples from different task types. In some examples, the joint strategy includes selecting a training sample (context c, questions q, and ground truth answer) from a different one of the task types with each iteration of the training. The goal of the joint strategy is to train against each of the task types concurrently without overly focusing on one task type over another. In practice, however, while system 300 learns each of the task types, it does not learn any of the task types particularly well. The joint training strategy is described in more detail in Collobert, et al. "A Unified Architecture for Natural Language Processing: Deep Neural Networks with Multitask Learning," International Conference on Machine Learning 2008, pp. 160-167 and Hashimoto, et al., "A Joint Many-task Model: Growing a Neural Network for Multiple NLP Tasks," Conference on Empirical Methods in Natural Language Processing, 2017, pp. 1923-33, each of which is incorporated by reference in its entirety.

In some embodiments, system 300 may be trained according to a sequential training strategy where system 300 is trained using an ordering where training samples are presented to system 300 so as to train system 300 against each of the task types individually. That is, the order in which training samples are presented to system 300 for training is to present each of the samples for a first task type before presenting each of the training samples for a second task type, and so on before again presenting each of the samples for the first task type again, etc. In the sequential training strategy, when the training against one of the type types finishes and the training switches to a second of the task types some catastrophic forgetting of the first task type begins to occur. However, after multiple passes through the training samples for each of the task types in turn, system 300 begins to recover the training for each of the previously trained task types more quickly and gathers dormant knowledge. In some examples, because of the catastrophic forgetting that occurs when the training switches between the task types, system 300 generally only exhibits strong learning of the last trained task type. The sequential training strategy is described in more detail in Kirkpatrick, et al., "Overcoming Catastrophic Forgetting in Neural Networks," Proceedings of the National Academy of Sciences, 2017, pp. 3521-3526, which is incorporated by reference in its entirety.

In some embodiments, attempts at addressing the limitations of the joint training and sequential training strategies have been proposed. In some examples, these include generation of computationally expensive Fisher information, use of task-specific modifications (e.g., packing and/or adaption strategies), which negatively impacts the goal of a unified system for all task types, and/or the like.

In some embodiments, system 300 may be trained according to a hybrid training strategy. In the hybrid training strategy, system 300 is initially trained using the sequential training strategy. This allows system 300 to gather the dormant knowledge of each of the task types. After a number of passes through the training samples for each of the task types, system 300 is then trained using the joint training strategy. Because of the dormant knowledge from the initial sequential training, the follow-on joint training is able to more effectively learn each of the task types even while performing multitasking, than joint training alone without the initial sequential training. By allowing system 300 to fully repress previously trained task types during the initial sequential training into dormant knowledge, the hybrid training strategy gives system 300 more time to focus on specializing for each of the task types. In some examples, the hybrid training strategy decouples the goal of learning each task type form learning how to do all task types together. Thus, when the training switches to the joint training strategy, system 300 is well prepared to learn each of the task types well.

In some embodiments, system 300 is trained according to a synthesize training strategy, which is a variation of the hybrid training strategy. In the synthesize training strategy, system 300 is initially trained using the sequential training strategy, but at fixed intervals and for a fixed number of iterations during the sequential training, the training switches to a joint training strategy across each of the task types that have been previously trained before returning to the sequential training strategy. By temporarily switching to the joint training strategy for the previously learned task types, system 300 is more often reminded of old task types and is also forced to synthesize old knowledge with new knowledge.

Figure 7:
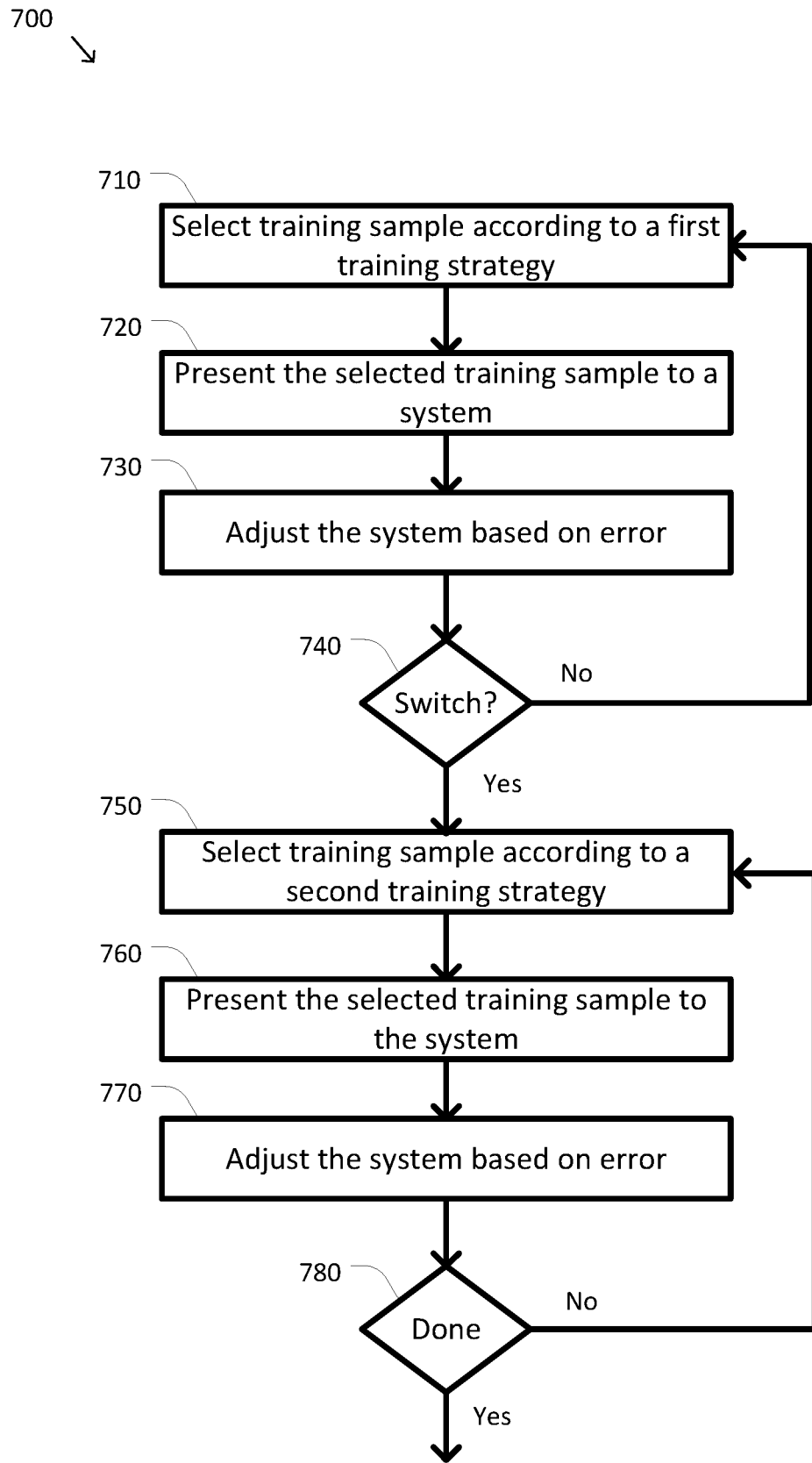
FIG. 7 is a simplified diagram of a method of multitask learning according to some embodiments.

FIG. 7 is a simplified diagram of a method 700 of multitask learning according to some embodiments. One or more of the processes 710-780 of method 700 may be implemented, at least in part, in the form of executable code stored on non-transitory, tangible, machine-readable media that when run by one or more processors may cause the one or more processors to perform one or more of the processes 710-780. In some embodiments, method 700 may be used as a hybrid training strategy for training system 300, however, method 700 may also be used to train other multitasking systems other than system 300. In some embodiments, the task types trained by method 700 may include any of various natural language processing tasks, such as language translation, classification (e.g., sentiment analysis), question answering, and/or the like.

At a process 710, a training sample is selected according to a first training strategy. In some embodiments, the first training strategy is a sequential training strategy where training samples are selected from training samples for a first task type until each of the training samples for the first task type are selected before selecting training samples from a second task type different from the first task type until each of the training samples for the second task type are selected. Training samples are then selected from additional task types, if any, in turn with switching to the next task type occurring after each of the training samples for each of the task types are selected. In some examples, the selected training sample includes a natural language context, a natural language question, and a ground truth natural language answer corresponding to the context and the question.

At a process 720, the selected training sample is presented to a system. In some examples, the system is system 300. When the training sample is applied to the system it is fed forward through the various layers of the system according to the currently trained parameters (e.g., weights and biases) and an answer is generated. In some examples, the answer is a natural language phrase.

At a process 730, the system is adjusted based on error. The answer generated by the system during process 720 is compared to the ground truth answer for the selected training sample and the error for the selected training sample is determined. The error may then be fed back to system 300 using back propagation to update the various parameters (e.g., weights and biases) of the layers. In some examples, the back propagation may be performed using the stochastic gradient descent (SGD) training algorithm the adaptive moment estimation (ADAM) training algorithm, and/or the like. In some examples, the gradients used for the back propagation may be clipped to 1.0. In some examples, the learning decay rate may be the same rate used by Vaswani, et al., "Attention is All You Need," arXiv preprint arXiv: 1706.03762, submitted Jun. 12, 2017.

At a process 740, it is determined whether to switch from the first training strategy to a second training strategy. In some examples, the decision to switch to the second training strategy occurs after each of the training samples for each of the task types has been selected a predetermined number of times. In some examples, the predetermined number of times may be five, although any other number such as three, four, and/or six or more may also be used. In some examples, one or more other factors may be used to make the determination about when to switch to the second training strategy. In some examples, the one or other factors may include monitoring changes in performance metrics for each of the task types with each pass through the training samples and making the switch when an improvement in each of the performance metrics after each pass improves by less than a threshold amount. When it is determined not to switch to the second training strategy, method 700 returns to process 710 where training samples continue to be selected according to the first training strategy. When it is determined to switch to the second learning training strategy, selection of the training samples occurs using the second training strategy beginning with a process 750.

At the process 750, a training sample is selected according to a second training strategy. In some examples, the second training strategy is a joint training strategy where training samples are selected equally from training samples for each of the task types.

At a process 760, the selected training sample is presented to the system using substantially the same process as process 720.

At a process 770, the system is adjusted based on error using substantially the same process as process 730.

At a process 780, it is determined whether the training is complete. In some examples, the training is complete after the training samples for each of the task types has been presented to the system a predetermined number of times. In some examples, the predetermined number of times may be eight, although any other number such as two to seven and/or nine or more may also be used. In some examples, one or more other factors may be used to make the determination about when training is complete. In some examples, the one or other factors may include monitoring changes in performance metrics for each of the task types with each pass through the training samples and noting that training is complete when an improvement in each of the performance metrics after each pass improves by less than a threshold amount. When it is determined that training is not complete, method 700 returns to process 740 where training samples continue to be selected according to the second training strategy. When it is determined that training is complete, method 700 ends and the trained system may now be used for any of the tasks for which it is trained.

After training is complete, the trained system may be used for any of the task types using a process substantially similar to process 720 and/or 760 where a context c and a question q may be presented to the system and fed forward through the various layers of the system according to the parameters (e.g., weights and biases) trained according to method 700. The generated answer then corresponds to the response to the presented context c and question q.

As discussed above and further emphasized here, FIG. 7 is merely an example which should not unduly limit the scope of the claims. One of ordinary skill in the art would recognize many variations, alternatives, and modifications. In some embodiments, method 700 is adapted to use the synthesize training strategy. In the synthesize training strategy, the first training strategy is a variation of the sequential training strategy and the second training strategy may be the joint training strategy. The variation of the sequential training strategy includes generally selecting the training sample according to the sequential training strategy except during intervals when the training sample is selected according to the joint training strategy. In some examples, the location and placement of the joint training strategy intervals may be based on a number of training iterations (e.g., a number of training samples presented to the system) for each task type. As a non-limiting example, selection of the training samples may include selecting 10,000 training samples for a first task type, selecting 1000 training samples jointly from each of the task types, selecting another 10,000 training samples for the first task type, selecting 1000 training samples joints from each of the task types, and then repeating until each of the training samples of the first task type are presented and then selecting 10,000 training samples for a second task type, etc. In some examples, the number of training samples before alternating between sequential and joint types of selection may be based on a percentage of a number of training samples for each task type (e.g., after anywhere from 10% to 25% of the number of training samples for the respective task type).

FIG. 8 is a simplified diagram of training performance according to some embodiments. More specifically, FIG. 8 shows the results of training system 300 according to four task types: English to German (EN-DE) language translation, English to French (EN-FR) language translation, question answering, and sentiment classification.

Training samples for the English to German and English to French translation task types are based on the International Workshop on Spoken Language Translation English to German (IWSLT EN->DE) and English to French (IWSLT EN->FR) training sets, which contain approximately 210,000 sentence pairs transcribed from TED talks. The performance metric used for the two language translation task types is the BLEU score.

Training samples for the question answering task type are based on the Stanford Question Answering Dataset (SQuAD), which includes 10,570 training samples based on questions related to paragraph samples from Wikipedia articles. The performance metric used for the question answering task type is the F1 score.

Training samples for the sentiment classification task type are based on the Stanford Sentiment Treebank (SST) where neutral examples are removed. The SST includes approximately 56,400 training samples based on movie reviews and their sentiment. The performance metric used for the sentiment classification task type is percentage of exact match.

FIG. 8 further shows the learning results for each task type according to the previously described performance metrics. Three results for each task type are shown. The single column indicates the respective performance metric when system 300 is trained using only training samples for the indicated task type. The joint column indicates the same performance metric when system 300 is trained using the joint training strategy. The hybrid column indicates the same performance metric when system 300 is trained using the hybrid training strategy of method 700. As expected, the single task type training results have the highest performance metrics as each version of system 300 was allowed to specialize in the single task. The joint column shows that use of the joint training strategy results in significantly poorer results, and the hybrid column shows the improvement of using the hybrid training strategy of method 700 over the joint training strategy. Further, with the exception of the sentiment classification task type, the hybrid training strategy of method 700 resulted in significantly superior performance results over the joint training strategy.

Figure 9A:
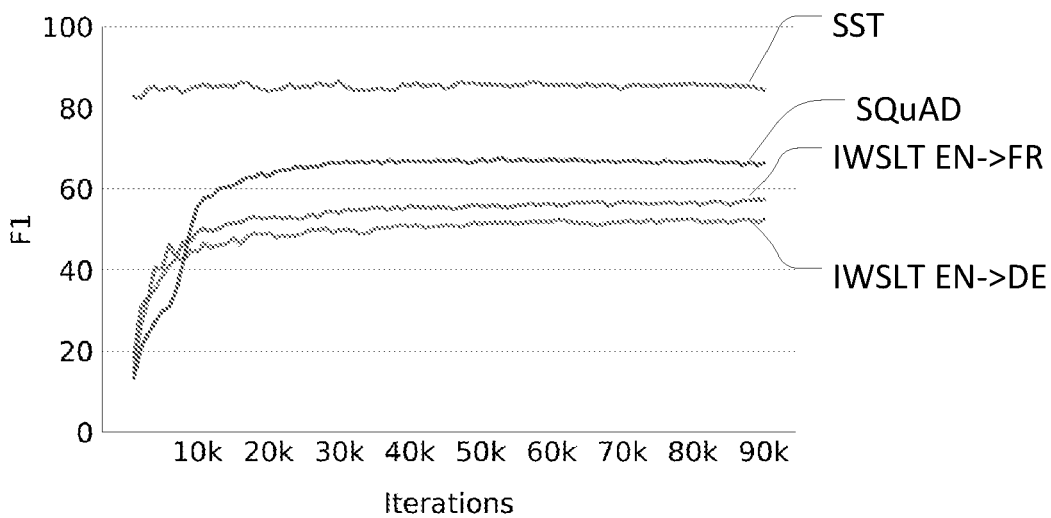
Figure 9B:
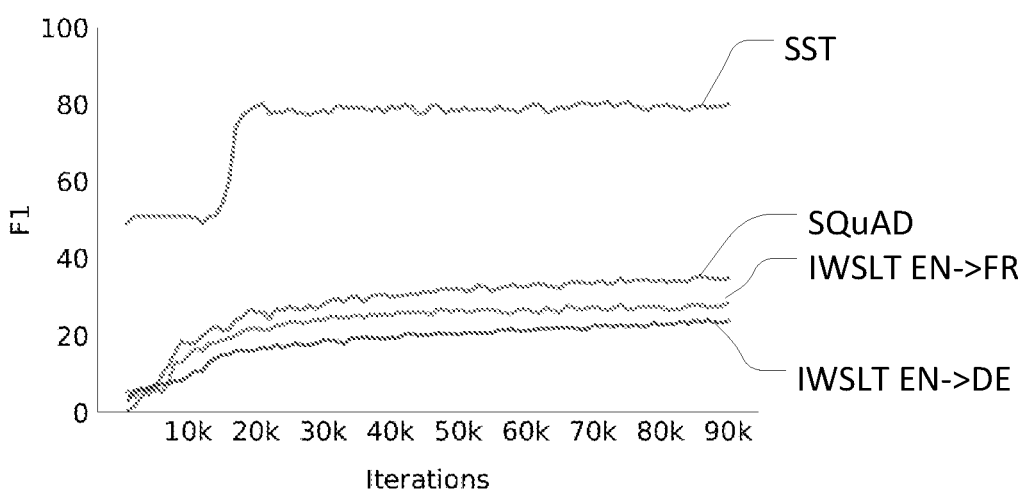
Figure 9C:
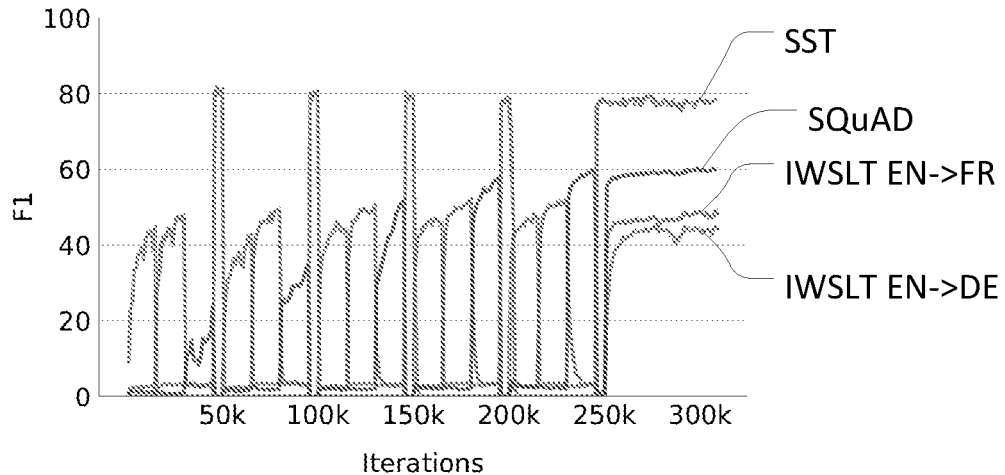

FIGS. 9A-9C are simplified diagrams of training performance according to some embodiments. FIG. 9A tracks the respective performance metrics over training iterations for each of the task types when system 300 is trained separately for each of the task types. (E.g., compare to the single column of FIG. 8.) Thus, FIG. 9A shows the results for four separately trained versions of system 300. FIG. 9B tracks the respective performance metrics when system 300 is trained according to the joint training strategy. As the performance metrics of FIG. 9B indicate, other than the SST classification task type, the version of system 300 trained using the joint training strategy did not learn any of the task types particularly well. FIG. 9C tracks the respective performance metrics when system 300 is trained according to the hybrid training strategy of method 700. The effects of catastrophic forgetting as the training samples switch from one task type to another during the initial sequential training are clearly apparent in FIG. 9C. After training samples from each of the task types have been presented five times using the sequential training strategy and the training strategy switches to the joint training strategy (at approximately iteration 250,000) the performance metrics rapidly improve to values that are better than the performance metrics of the joint training strategy only approach of FIG. 9B and more closely reach the performance metrics of the separately trained versions of system 300 in FIG. 9A.

FIGS. 10A and 10B are simplified diagrams of training performance based on training order according to some embodiments. FIGS. 10A and 10B demonstrate the impact of changing the order in which training for the various task types are presented to system 300 during the initial sequential training of the hybrid training strategy. As shown in FIG. 10A, when system 300 is first trained with training samples from the English to German (IWSLT EN->DE) language translation task type before being trained with training samples from the sentiment classification (SST) task type, system 300 is able to quickly recover its English to German translation knowledge when the training samples are again drawn from the English to German language translation task type. In contrast, FIG. 10B shows that when system 300 is first trained against the sentiment classification task type before being trained against the English to German language translation task type, system 300 is not able to learn the English to German language translation task type very well. It is speculated that this is due to the initial training against the English to German language translation task type leading to better initial encoding knowledge due to the greater complexity and richness of the training samples.

Some examples of computing devices, such as computing device 100 may include non-transitory, tangible, machine readable media that include executable code that when run by one or more processors (e.g., processor 210) may cause the one or more processors to perform the processes of method 700. Some common forms of machine readable media that may include the processes of method 700 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/ or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system for natural language processing, the system comprising:
    one or more processors; and
    a memory storing computer-executable instructions, which when executed by the one or more processors, cause the system to perform operations comprising:
        encoding, using an input layer, first words from a context and second words from a question;
        encoding and decoding, using a self-attention based transformer, an output of the input layer;
        further encoding, using a first bi-directional long-term short-term memory (biLSTM), an output of the encoding;
        generating, using a long-term short-term memory (LSTM), a context-adjusted hidden state from an output of the decoding and a first hidden state of a first time step;
        generating, using an attention network, first attention weights based on an output of the first biLSTM and an output of the LSTM;
        generating, using a vocabulary layer, a distribution over third words in a vocabulary based on the first attention weights;
        generating, using a context layer, a distribution over the first words from the context based on the first attention weights; and
        generating, using a switch, a weighting between the distribution over the third words from the vocabulary and the distribution over the first words from the context;
        generating, using the switch, a composite distribution based on the weighting between the distribution over the third words from the vocabulary and the distribution over the first words from the context; and
        selecting, using the switch, a word for inclusion in an answer using the composite distribution.

2. The system of claim 1, wherein the input layer comprises one or more of a linear layer, a second biLSTM, a coattention layer, and a third biLSTM.

3. The system of claim 2, wherein the coattention layer:
    generates an affinity matrix between encoded representations of the context and the question;
    generates second attention weights based on the affinity matrix; and
    generates weighted sums of the context and the question using the second attention weights.

4. The system of claim 1, wherein the vocabulary layer comprises:
    a tanh layer for generating a second hidden state for a second time step subsequent to the first time step based on the first attention weights, the further encoding of the output of the encoding, and the context-adjusted hidden state; and
    a softmax layer for generating the distribution over the third words in the vocabulary based on the second hidden state.

5. The system of claim 1, wherein the self-attention based transformer, the LSTM, the attention network, the vocabulary layer, the context layer, and the switch iteratively select each word for the answer.

6. The system of claim 1, wherein the self-attention based transformer comprises a plurality of transformer layers, each of the plurality of transformer layers comprising an encoder portion having a first multi-head self-attention network and a decoder portion having a second multi-head self-attention network and a third multi-head attention network.

7. The system of claim 1, wherein the system is trained using a hybrid training strategy where the system is first trained against a plurality of task types using a sequential training strategy and is then trained against the plurality of task types using a joint training strategy.

8. The system of claim 7, wherein each of the plurality of task types is a language translation task type, a classification task type, or a question answering task type.

9. A method for natural language processing, the method comprising:
    receiving first words from a context and second words from a question;
    encoding, using an input layer, the first words from the context and the second words from the question to generate a first encoding;

further encoding, using a self-attention based transformer, the first encoding to generate a second encoding of the first words from the context and the second words from the question;

decoding, using the self-attention based transformer, the second encoding to generate a decoder output;

further encoding, using a first bi-directional long-term short-term memory (biLSTM), the second encoding to generate a third encoding;

generating, using a long-term short-term memory (LSTM), a context-adjusted hidden state from the third encoding and a first hidden state of a first time step;

generating, using an attention network, first attention weights based on the third encoding and the context-adjusted hidden state;

generating, using a vocabulary layer, a distribution over third words in a vocabulary based on the first attention weights;

generating, using a context layer, a distribution over the first words from the context based on the first attention weights;

generating, using a switch, a weighting between the distribution over the third words from the vocabulary and the distribution over the first words from the context;

generating, using the switch, a composite distribution based on the weighting between the distribution over the third words from the vocabulary and the distribution over the first words from the context; and selecting, using the switch, a word for inclusion in an answer using the composite distribution.

10. The method of claim 9, further comprising:

generating, using a coattention layer, an affinity matrix between encoded representations of the context and the question;

generating, using the coattention layer, second attention weights based on the affinity matrix; and generating, using the coattention layer, weighted sums of the context and the question using the second attention weights.

11. The method of claim 9, further comprising:

generating, using a tanh layer of the vocabulary layer, a second hidden state of a second time step subsequent to the first time step based on the first attention weights, the second encoding, and the context-adjusted hidden state; and generating, using a softmax layer of the vocabulary layer, the distribution over the third words in the vocabulary based on the second hidden state.

12. The method of claim 9, further comprising iteratively selecting each word for the answer using the self-attention based transformer, the LSTM, the attention network, the vocabulary layer, the context layer, and the switch.

13. The method of claim 9, wherein:

generating the second encoding comprises using one or more encoding layers, wherein each encoding layer has a first multi-head self-attention network; and generating the decoder output comprises using one or more decoding layers, each decoding layer having a second multi-head self-attention network and a third multi-head attention network.

14. A non-transitory machine-readable medium comprising a plurality of machine-readable instructions which when executed by one or more processors associated with a computing device are adapted to cause the one or more processors to perform a method comprising:

receiving first words from a context and second words from a question;

encoding the first words from the context and the second words from the question to generate a first encoding;

further encoding, using self-attention, the first encoding to generate a second encoding of the first words from the context and the second words from the question;

decoding, using self-attention, the second encoding to generate a decoder output;

further encoding the second encoding to generate a third encoding;

generating a context-adjusted hidden state from the third encoding and a first hidden state of a first time step;

generating first attention weights based on the third encoding and the context-adjusted hidden state;

generating a distribution over third words in a vocabulary based on the first attention weights;

generating a distribution over the first words from the context based on the first attention weights;

generating a weighting between the distribution over the third words from the vocabulary and the distribution over the first words from the context;

generating a composite distribution based on the weighting between the distribution over the third words from the vocabulary and the distribution over the first words from the context; and selecting a word for inclusion in an answer using the composite distribution.

15. The non-transitory machine-readable medium of claim 14, wherein the method further comprises:

generating an affinity matrix between encoded representations of the context and the question;

generating second attention weights based on the affinity matrix; and generating weighted sums of the context and the question using the second attention weights.

16. The non-transitory machine-readable medium of claim 14, wherein the method further comprises:

generating a second hidden state of a second time step subsequent to the first time step based on the first attention weights, the second encoding, and the context-adjusted hidden state; and generating the distribution over the third words in the vocabulary based on the second hidden state.

17. The non-transitory machine-readable medium of claim 14, wherein the method further comprises iteratively selecting each word for the answer.

18. The non-transitory machine-readable medium of claim 14, wherein:

generating the second encoding comprises using one or more encoding layers, wherein each encoding layer has a first multi-head self-attention network; and generating the decoder output comprises using one or more decoding layers, each decoding layer having a second multi-head self-attention network and a third multi-head attention network.

19. The non-transitory machine-readable medium of claim 14, wherein the method further comprises training using a hybrid training strategy, the hybrid training strategy includes first training against a plurality of task types using a sequential training strategy and then training against the plurality of task types using a joint training strategy.

20. The non-transitory machine-readable medium of claim 19, wherein each of the plurality of task types is a language translation task type, a classification task type, or a question answering task type.

\* \* \* \* \*